United States Patent [19]

Renneker et al.

[11] Patent Number: 5,282,362
[45] Date of Patent: Feb. 1, 1994

[54] REDUCED LEAKAGE TORQUE CONVERTER TURBINE AND IMPELLER

[75] Inventors: Craig M. Renneker, Bloomfield Township, Oakland County; Joel M. Maguire, Dearborn, both of Mich.

[73] Assignee: General Motors Corporation, Detroit, Mich.

[21] Appl. No.: 937,028

[22] Filed: Aug. 31, 1992

[51] Int. Cl.⁵ .................................................. F16D 33/00
[52] U.S. Cl. ........................................ 60/345; 60/365; 29/889.5
[58] Field of Search .................. 60/330, 341, 345, 361, 60/362, 364, 365, 366, 367; 29/888, 889, 889.21, 889.7, 889.5, 889.71

[56] References Cited

U.S. PATENT DOCUMENTS

| | | | |
|---|---|---|---|
| 3,137,915 | 6/1964 | Smirl | 29/889.5 |
| 3,869,258 | 3/1975 | Scott | 29/889.5 X |
| 3,886,740 | 6/1975 | Krok | 60/367 X |
| 4,098,080 | 7/1978 | Pogorelov et al. | 60/361 |
| 4,450,611 | 5/1984 | Ito et al. | 29/889.5 X |
| 5,113,654 | 5/1992 | Sahashi | 60/330 |

FOREIGN PATENT DOCUMENTS

| | | | |
|---|---|---|---|
| 461409 | 11/1949 | Canada | 60/366 |
| 0019863 | 2/1977 | Japan | 29/889.5 |
| 642784 | 9/1950 | United Kingdom | 60/330 |

*Primary Examiner*—Edward K. Look
*Assistant Examiner*—Hoang Nguyen
*Attorney, Agent, or Firm*—Kevin M. Hinman

[57] ABSTRACT

A torque converter has a turbine and a pump with elastomeric linings on its core and shell surfaces proximate to the blades. The elastomeric linings are deformed where the blades engage the core and shell surfaces. This localized deformation effects a seal between the blades and the core and shell surfaces. This seal eliminates leakage between the blades and the cores and the shells, thereby increasing torque converter efficiency.

12 Claims, 3 Drawing Sheets

REDUCED LEAKAGE TORQUE CONVERTER TURBINE AND IMPELLER

TECHNICAL FIELD

This invention relates to hydraulic torque converters used in motor vehicles between an engine and an automatic transmission.

BACKGROUND OF THE INVENTION

Conventional torque converter turbines and impellers, or pumps, are typically assembled from stamped pieces. These pieces are a shell, a core and a plurality of blades for disposition between the core and the shell, for both the impeller and the turbine. The blades have tabs on opposing first and second edges. The tabs on the first edge of the turbine blades are inserted into corresponding perforations in the turbine shell. The turbine core is then placed over the tabs on the second edges of the blades. The tabs passing through both the turbine core and the turbine shell are bent over, locking the core, the shell and the blades together as an assembled turbine. The tabs on the first edge of the impeller blades are inserted into corresponding pockets in the impeller shell. Stakes are wedged into the pockets to retain the tabs. The impeller core is then placed over the tabs on the second edge of the impeller blades. The tabs passing through the impeller core are then bent over, locking the core, the shell and the blades together as an assembled impeller.

Gaps are generally present between the first edges of the blades and the shell, and between the second edges of the blades and the core. These gaps are a result of variations inherent to forming the parts by stamping. These gaps represent potential leak points or paths between the blade edges and the core and the shell. There are additional potential leak points where tabs pass through the cores or the shells, allowing fluid to escape the pump or impeller. Any such leakage reduces the efficiency of the torque converter.

The desirability of closing these gaps is well known. Sealing these gaps has the benefit of increasing the efficiency of the torque converter.

Attempts to seal these gaps have been made in the past. Brazing is one method used. The gaps are filled with molten metal. Brazing has the disadvantage of being expensive because of its time consuming nature. Another disadvantage of brazing is that the metal added to fill the gaps significantly increases the inertia of components. Brazing can also result in thermal distortion and annealing of the sheet metal parts.

SUMMARY OF THE INVENTION

This invention seals leak paths within a torque converter turbine and a torque converter impeller by providing elastomeric linings on inner surfaces of the respective shells and cores. The shells and cores are provided with the elastomeric linings before assembly of the blades to the shells and cores. When assembled, the edges of the blades press into the liners, deforming the liners, thereby forming a seal between the edges of the blades and cores and the hubs.

Impellers and turbines sealed with elastomeric liners provide a number of advantages. The sensitivity of the torque converter turbine and impeller to manufacturing variations in the profile of the blades and the corresponding profile of the cores and shells is reduced because of the variances accommodated by the elastomeric lining. This reduced sensitivity allows greater tolerances in those parts, thereby reducing manufacturing costs. Also, the temperatures used to bond the elastomeric lining to the core and the shell are not high enough to result in a risk of annealing or thermal distortion of the sheet metal parts, as would be the case with brazing. Additionally, the increase in rotative inertia resulting from the addition of the elastomeric lining is very minimal, particularly when compared with the effect of brazing on rotative inertia.

It is an object of this invention to provide an improved torque converter having a turbine and an impeller with one or both having elastomeric liners on the respective shell and the core, thereby reducing leakage within the torque converter.

It is another object of this invention to provide an improved fluid torque converter including a turbine with a core and a shell, and a complement of turbine blades disposed between the core and the shell, the converter having an impeller with the core and a shell and a complement of impeller blades disposed between the core and the shell, and the converter also having a stator with a principally annular stator core and a principally annular stator shell with a complement of stator blades disposed therebetween, the torque converter having one of the turbine and impeller shells with an elastomeric shell lining over an inner surface of the shell with first edges of the blades pressing into the elastomeric shell lining, thereby sealing the first edges of the blades against the shell, and an elastomeric core lining over the outer surface of the core with second edges of the blades pressing into the elastomeric core lining, thereby sealing the second edges of the blades against the core.

These and other objects and advantages will be more apparent from the following description and drawings.

DESCRIPTION OF THE PREFERRED EMBODIMENT

Figure 1:
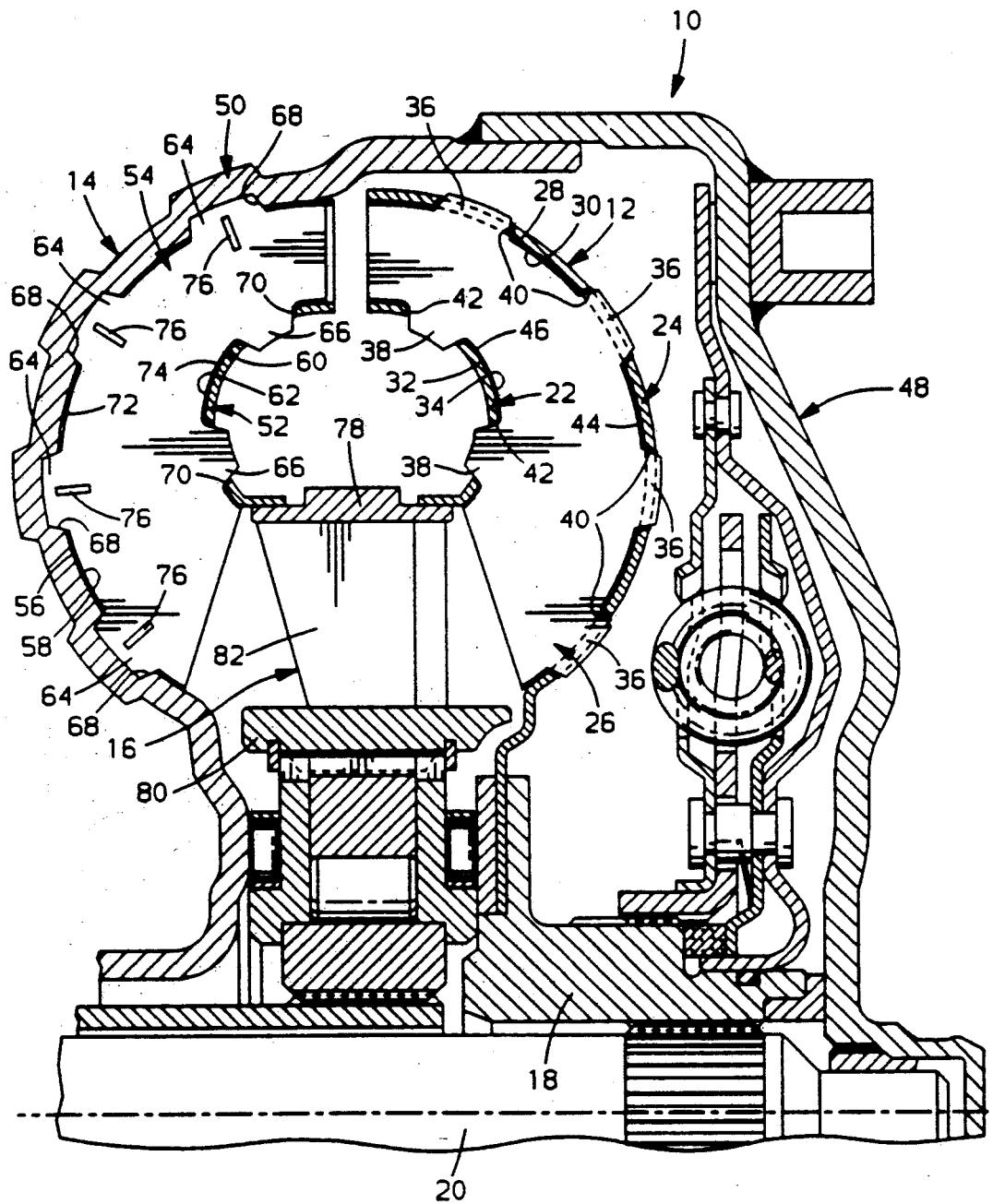
FIG. 1 is a sectional view of a top half of a torque converter.

A fluid torque converter 10 is located between a vehicle engine (not shown) and a vehicle transmission (not shown). The torque converter 10 is generally toroidally shaped. The torque converter 10 has three principal fluid working elements: a turbine 12, an impeller or pump 14 and a stator 16.

The turbine 12, which has a generally semitoroidal shape, is rotatively fixed to a converter output element 18. The converter output element 18 is, in turn, rotatively fixed to a transmission input element 20. The turbine 12 is comprised of a principally semitoroidal turbine core 22 and a principally semitoroidal turbine shell 24, with a complement of turbine blades 26 disposed between the turbine core 22 and the turbine shell 24.

The turbine blades 26 each have a first edge 28 complementary to an inner surface 30 of the turbine shell 24, and a second edge 32 complementary to an outer surface 34 of the turbine core 22. Each of the turbine blades 26 has four first tabs 36 on the first edge 28 engaging the turbine shell 24, and two second tabs 38 on the second edge 32 engaging the turbine core 22. The turbine shell 24 and the turbine core 22 each have corresponding shell and core tab receptors in the form of shell and core perforations 40,42 to accommodate the tabs 36,38.

An elastomeric turbine shell lining 44 is on the inner surface 30 of the shell 24. The lining 44 covers the perforations 40 before the turbine 12 is assembled. Similarly, the turbine core 22 has an elastomeric lining 46 covering the outer surface of the core 22 and the perforations 42 before the turbine 12 is assembled. When the blades 26 are assembled to the core 22 and the shell 24, the tabs 38,36 pierce the lining 46,44 covering the perforations 42,40. The tabs 38,36 of the turbine blades 26 are disposed in their respective perforations 42,40 in the core 22 and the shell 24, and are bent to retain the turbine core 22 and the turbine shell 24 to the turbine blades 26. The elastomeric linings 44,46 in the shell 24 and the core 22 deform where contacted by the blade edges 28,32, thereby sealing the edges 28,32 of the blades 26 against the inner surface 30 of the shell 24 and the outer surface 34 of the core 22.

The impeller 14, which also has a generally semitoroidal shape, is rotatively fixed to a converter input element 48. The converter input element 48 is, in turn, rotatively fixed to an engine crankshaft (not shown). The converter input element 48 is commonly known as an input shell or a torque converter housing. An impeller shell 50 is a rear portion of this input element 48, being proximate to the transmission and distal to the engine. The impeller 14 is comprised of a principally semitoroidal impeller core 52, the principally semitoroidal impeller shell 50, and a complement of impeller blades 54 disposed between the impeller core 52 and the impeller shell 50.

The impeller blades 54 each have a first edge 56 complementary to an inner surface 58 of the impeller shell 50, and a second edge 60 complementary to an outer surface 62 of the impeller core 52. Each of the impeller blades 54 has four first tabs 64 on the first edge 56 for engaging the impeller shell 50, and two second tabs 66 on the second edge 60 for engaging the impeller core 52. The impeller shell 50 and the impeller core 52 each have corresponding shell and core tab receptors in the form of shell pockets 68 and core perforations 70 to accommodate the tabs 64,66.

An elastomeric impeller shell lining 72 is located on the inner surface 58 of the shell 50. The shell lining 72 covers the pockets 68 before the impeller 14 is assembled. Similarly, the impeller core 52 has an elastomeric lining 74 which covers the outer surface 62 of the core 52 and the perforations 70 before the impeller 14 is assembled. When the blades 54 are assembled to the core 52 and the shell 50, the tabs 66,64 pierce the lining covering the pockets 68 and the perforations 70. The tabs 64,66 of the impeller blades 54 are disposed in their respective tab receptors 68,70. The first tabs 64 are retained in the pockets 68 by stakes 76 wedged in the pockets 68 between the shell 50 and the tabs 64. The second tabs 66 project through the core perforations 70 and are bent to retain the impeller core 52 to the impeller blades 54. The elastomeric linings 72,74 in the shell 50 and the core 52 deform where contacted by the blade edges 56,60, thereby sealing the edges of the blades 54 against the shell 50 and the core 52.

The stator 16 has a principally annular stator core 78 and a principally annular stator shell 80 with a complement of stator blades 82 disposed therebetween. The stator blades 82 are rigidly fixed to both the stator core 78 and the stator shell 80.

Some of the advantages of this invention are better appreciated by understanding how the turbine 12 and the impeller 14 employing it are formed and assembled.

The turbine 12 and the impeller 14 of such a torque converter 10 are formed principally of shells 24,50, cores 22,52, and blades 26,54, all stamped from sheet metal. The semitoroidal shape of the shells 24,50 and the cores 22,52 is provided by stamping operations. The curved shapes of the blades 26,54 needed to direct a flow of fluid in the torque converter 10 are provided in the stamping operation. Also, the form of the blade edges 28,32, 56,60 must be matched to fit the cores 22,52 and the shells 24,50. With conventional turbines, these parts 22,24,26 50,52,54 must be closely monitored and controlled to minimize gaps between the blades 26,54 and the shells 24,50 and cores 22,52. With the present invention, the need to minimize such gaps in the stamping operation is reduced. The sensitivity of this interface to stamping variations has been reduced.

The shells 24,50 and the cores 22,52 are also provided with tab receptors in the stamping operation. The turbine shells have the perforations 40 stamped in them. The impeller shells 24 have the pockets 68 stamped in them. The pockets 68 are used instead of perforations in the impeller shell 50 for the impeller 14 to prevent fluid within the torque converter 10 from escaping. Both the impeller core 52 and the turbine core 22 have perforations 70,42 stamped in them to serve as tab receptors. The blades 26,54 are provided with the tabs 36,38, 64,66 on the first edges 28,56 and the second edges 32,60 of the blades 26,54 when they are stamped.

The linings 44,46,74 are molded to the turbine shell 24 and to both the turbine and impeller cores 22,52.

Figure 2:
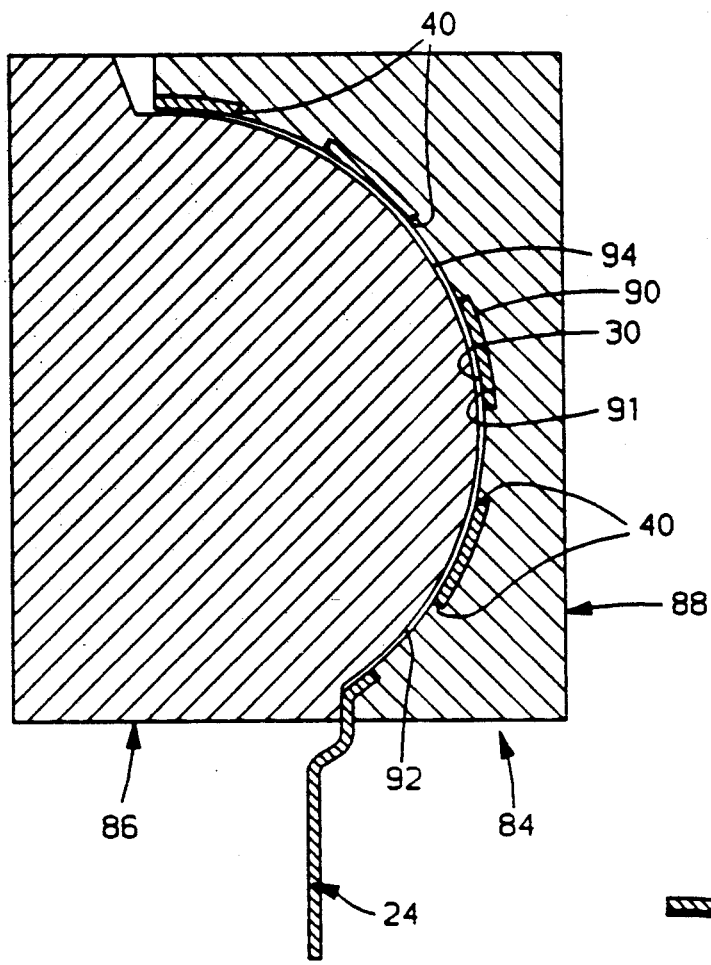
FIG. 2 is a sectional view of a top half of a die for a turbine shell lining with a turbine shell disposed therein.

The turbine shell 24 has its inner surface 30 grit blasted to provide improved surface adhesion. Portions of the shell 24 to which adhesion is not desired are coated with a material incompatible with rubber bonding to metal. Such materials are well known in the art of rubber molding. The shell 24 is placed in a shell die 84, sandwiched between an inner section 86 and an outer section 88 of the shell die 84, as shown in FIG. 2. An outer surface 90 of the turbine shell 24 rests on a die surface 91 of the outer section 88 of the die 84. A die surface 92 of the inner section 86 of the die 84 is separated from the inner surface 30 of the shell 24, providing an inner surface cavity 94 between the inner surface 30 of the shell 24 and the die surface 92 of the inner section 86.

Figure 3:
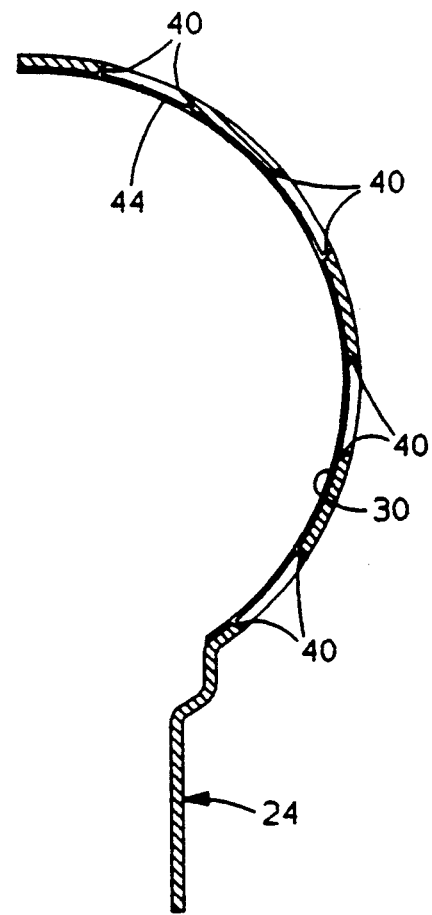
FIG. 3 is a sectional view of a top half of a turbine shell with the elastomeric lining fixed to an inside surface of the shell.

Uncured elastomeric material is forced into the inner surface cavity 94, forming the shell lining 44 of elastomeric material on the inner surface 30 of the shell 24. The temperature of the die 84 is elevated to cure the elastomeric material in keeping with well established molding techniques. It should be noted that the die 84 could be alternatively configured to allow the perforations 40 to be completely filled with elastomeric material, as seen in FIG. 3, or to provide no covering of elastomer over the perforations 40.

Figure 4:
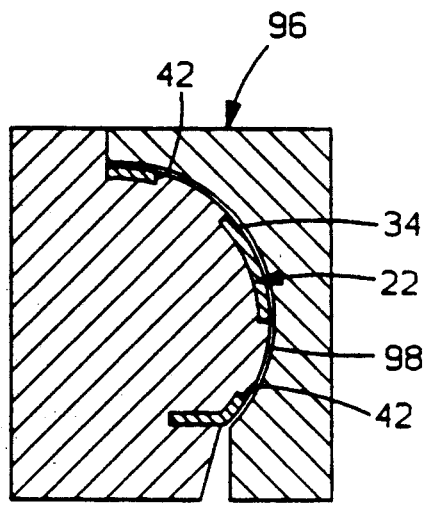
FIG. 4 is a sectional view of a top half of a die for a turbine core lining with a turbine core disposed therein.
Figure 5:
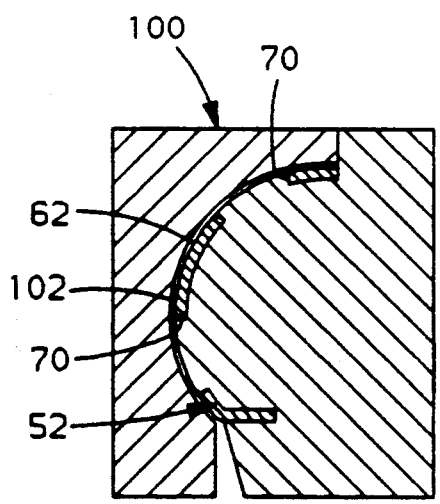
FIG. 5 is a sectional view of a top half of a die for an impeller core lining with a turbine core disposed therein.

Similarly, as seen in FIG. 4, the turbine core 22 is placed in a core die 96 which provides an outer surface cavity 98 between the the core die 96 and an outer surface 34 of the turbine core 22. Uncured elastomeric material is forced into the outer surface cavity 98 and thereby forms the core lining 46 on the outer surface 34 of the turbine core 22. This turbine core lining 46 covers the perforations 42 of the core 22 with uncured elastomeric material. The temperature of the die 96 is elevated to cure the elastomeric material in keeping with established molding techniques.

The impeller core 52 similarly receives the elastomeric impeller core lining 74 by placing the impeller core 52 in a core die 100 which provides an outer surface cavity 102 between the core die 100 and the outer surface 62 of the impeller core 52. Uncured elastomeric material is forced into the outer surface cavity 102 to form the impeller core lining 74 on the outer surface 62 of the impeller core 52. The lining 74 covers the perforations 70 of the core 52. The temperature of the die 100 is elevated to cure the elastomeric material in keeping with established molding techniques.

The impeller shell 50 has the impeller shell elastomeric lining 72 applied to it. However, the lining 72 is not molded to the shell 50 because it is desired to keep the pockets 68 in the impeller shell 50 from filling with elastomeric material. For that reason, a piece of elastomeric material is cut from a sheet of elastomeric material to the size required to line or cover the inner surface 58 of the shell 50. This elastomeric lining 72 is then bonded to the inside surface 58 of the impeller shell 50.

Following the lining of the shells and the cores with elastomeric material, the turbine blades 26 are assembled to the turbine shell 24 and turbine core 22, and the impeller blades 54 to the impeller shell 50 and impeller core 52.

The first tabs 36 of the turbine blades 26 are passed through the perforations 40 in the turbine shell 24 thereby piercing the elastomeric liner 44. The turbine core 22 has its perforations 42 located with respect to the second tabs 38, turbine blades 26 with the second tabs 38 passing through the perforations 42 of the turbine core 22, thereby piercing the elastomeric liner 46 on the turbine core 22. The shell 24 and the core 22 are then pressed toward each other, sealing the blades 26 with the core 22 and the shell 24 as the blade edges 28,32 are forced into the elastomeric liners 44,46. The blades 26 are fixed to both the shell 24 and to the core 22 by bending the tabs 36,38 over.

The first tabs 64 of the impeller blades 54 are pressed or passed into the pockets 68 of the impeller shell 50. The blades 54 are pressed toward the shell 50, sealing the blades 54 with the shell 50 as the first blade edges 56 are forced into the impeller shell lining 72. Stakes 76 are wedged into the pockets 68 between the impeller blade first tabs 64 and the pockets 68 to fix the blades 54 to the shell 50. The impeller core 52 has its perforations 70 aligned with the second tabs 60 of the impeller blades 54. The second tabs 66 are then passed into and through the perforations 70 in the impeller core 52. The impeller core 52 and the impeller shell 50 are pressed toward each other, sealing the blades 54 with the core 52 as the second blade edges 60 are forced into the impeller core lining 74. The tabs 66 passing through the core 52 are then bent over, thereby fixing the core 52 to the blades 54 and the shell 50 with respect to one another.

Testing of a torque converter having an elastomeric lining over only the turbine shell has shown a 0.75% increase in efficiency.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A fluid torque converter located between a vehicle engine and a vehicle transmission, generally toroidally shaped, comprising:
   a turbine, having a principally semitoroidal turbine core formed of sheet metal and a principally semitoroidal turbine shell formed of sheet metal and a complement of turbine blades formed of sheet metal being disposed between the turbine core and the turbine shell, the turbine blades having first edges complementary to an inner surface of the turbine shell and second edges complementary to an outer surface of the turbine core;
   an impeller, having a principally semitoroidal impeller core formed of sheet metal and a principally semitoroidal impeller shell formed of sheet metal and a complement of impeller blades formed of sheet metal being disposed between the impeller core and the impeller shell, the impeller blades having first edges complementary to an inner surface of the impeller shell and second edges complementary to an outer surface of the impeller core;
   a stator having a principally annular stator core and a principally annular stator shell and a complement of stator blades, the stator blades being disposed between the stator core and the stator shell; and
   one of the turbine and the impeller having at least one of:
   an elastomeric shell lining over the inner surface of the shell, the first edges of the blades pressing into the elastomeric shell lining, locally deforming the elastomeric shell lining, thereby sealing the first edges of the blades against the shell, and
   an elastomeric core lining over the outer surface of the core, the second edges of the blades pressing into the elastomeric core lining, locally deforming the elastomeric core lining, thereby sealing the second edges of the blades against the core.

2. A fluid torque converter as claimed in claim 1, further comprising:
   the other of the turbine and the impeller having at least one of:
   an elastomeric shell lining over the inner surface of the shell, the first edges of the blades pressing into the elastomeric shell lining, locally deforming the elastomeric shell lining, thereby sealing the first edges of the blades against the shell, and
   an elastomeric core lining over the outer surface of the core, the second edges of the blades pressing into the elastomeric core lining, locally deforming the elastomeric core lining, thereby sealing the second edges of the blades against the core.

3. A fluid torque converter located between a vehicle engine and a vehicle transmission, generally toroidally shaped, comprising:
   a turbine, having a principally semitoroidal turbine core formed of sheet metal and a principally semitoroidal turbine shell formed of sheet metal and a complement of turbine blades formed of sheet metal disposed between the turbine core and the turbine shell, the turbine blades each having a first edge complementary to an inner surface of the turbine shell and a second edge complementary to an outer surface of the turbine core, the turbine core having a plurality of core tab receptors provided by core perforations, the turbine shell having a plurality of shell tab receptors provided by shell perforations, each of the turbine blades having a first tab on the first edge passing through one of the shell perforations and a second tab on the second edge passing through one of the core perforations, the first and second tabs being bent to retain the turbine core and the turbine shell to the turbine blades;

an impeller, having a principally semitoroidal impeller core formed of sheet metal and a principally semitoroidal impeller shell formed of sheet metal and a complement of impeller blades formed of sheet metal being disposed between the impeller core and the impeller shell, the impeller blades each having a first edge complementary to an inner surface of the impeller shell and a second edge complementary to an outer surface of the impeller core, the impeller core having a plurality of core tab receptors provided by core perforations, the impeller shell having a plurality of shell tab receptors provided by shell pockets, each of the impeller blades having a first tab on the first edge disposed in one of the shell pockets, the first tabs being locked in the pockets by stakes wedged between the pocket and the first tabs to retain the impeller blades to the impeller shell, and each of the impeller blades having a second tab on the second edge passing through one of the core perforations, the tabs being bent to retain the impeller blades to the impeller core;

a stator having a principally annular stator core and a principally annular stator shell and a complement of stator blades, the stator blades being disposed between the stator core and the stator shell, the stator blades being rigidly fixed to both the stator core and the stator shell; and one of the turbine and the impeller having at least one of:

an elastomeric shell lining over the inner surface of the shell, the first edges of the blades pressing into the elastomeric shell lining, locally deforming the elastomeric shell lining, thereby sealing the first edges of the blades against the shell, and an elastomeric core lining over the outer surface of the core, the second edges of the blades pressing into the elastomeric core lining, locally deforming the elastomeric core lining, thereby sealing the second edges of the blades against the core.

4. A fluid torque converter as claimed in claim 3, further comprising:

the other of the turbine and the impeller having both:
an elastomeric shell lining over the inner surface of the shell, the first edges of the blades pressing into the elastomeric shell lining, locally deforming the elastomeric shell lining, thereby sealing the first edges of the blades against the shell; and
an elastomeric core lining over the outer surface of the core, the second edges of the blades pressing into the elastomeric core lining, locally deforming the elastomeric core lining, thereby sealing the second edges of the blades against the core.

5. A torque converter as claimed in claim 3, further comprising:
the elastomeric shell lining covering the shell tab receptors prior to the first tabs of the blades being passed into the tab receptors; and
the elastomeric core lining covering the turbine core tab receptors prior to the second tabs of the blades being passed into the tab receptors.

6. A torque converter as claimed in claim 4, further comprising:
the elastomeric shell lining covering the shell tab receptors prior to the first tabs of the blades being passed into the tab receptors; and
the elastomeric core lining covering the turbine core tab receptors prior to the second tabs of the blades being passed into the tab receptors.

7. A method of forming either of a torque converter turbine and a torque converter impeller comprising:
stamping a shell of sheet metal;
providing a shell lining of elastomeric material on an inner surface of the shell;
stamping a core of sheet metal;
providing a core lining of elastomeric material on an outer surface of the core;
stamping blades of sheet metal;
assembling the shell, the core, and the blades with the blades disposed between the shell and the core, with first blade edges being proximate to the inner surface of the shell and second blade edges being proximate to the outer surface of the core;
pressing the shell and the core toward each other; and
fixing the blades to the shell and the blades to the core.

8. A method of forming either of a torque converter turbine and a torque converter impeller as claimed in claim 7, further comprising:
providing a plurality of tab receptors in the shell in stamping the shell;
providing a plurality of tab receptors in the core in stamping the shell;
providing tabs on the first edges and on the second edges of blades in stamping the blades;
passing the tabs of the blades into tab receptors in the shell and the core; and
fixing the tabs within the tab receptors.

9. A method of forming a torque converter turbine as claimed in claim 8, further comprising:
providing a plurality of perforations to serve as the tab receptors in the shell in stamping the shell;
providing a shell die which provides an inner surface cavity between the shell die and an inner surface of the shell;
placing the shell in the shell die;
forcing an uncured elastomeric material into the inner surface cavity, thereby forming a shell lining of elastomeric material on the inner surface of the shell;
curing the elastomeric material;
providing a plurality of perforations to serve as the tab receptors in the core in stamping the core;
providing a core die which provides an outer surface cavity between the core die and an outer surface of the core;
placing the core in the core die;

forcing an uncured elastomeric material into the outer surface cavity, thereby forming a core lining on the outer surface of the core;

curing the elastomeric material;

passing the tabs of the blades into and through the perforations in the shell and the core; and bending over the tabs to fix the blades to the shell and to the core after pressing the shell and core toward each other.

10. A method of forming a turbine as claimed in claim 9, further comprising:

covering the perforations of the core and the shell with uncured elastomeric material while the core and the shell are in their dies prior to the curing of the elastomeric material; and piercing the cured elastomeric material covering the perforations by passing the tabs through the perforations.

11. A method of forming an impeller as claimed in claim 10, further comprising:

providing a plurality of pockets to serve as the tab receptors in the shell in the stamping of the shell;

providing a plurality of perforations to serve as the tab receptors in the core in the stamping of the core;

passing the tabs on the first edges of the blades into the pockets in the shell;

wedging stakes between the turbine blade tabs and the pockets, thereby fixing the blades to the shell;

passing the tabs on the second edges of the blades into and through the perforations in the core; and bending over the tabs after pressing the shell and the core toward each other.

12. A method of forming a turbine as claimed in claim 11, further comprising:

covering the perforations of the core and covering the pockets of the shell with elastomeric material; and piercing the elastomeric material covering the tab receptors by the passing of the tabs into the receptors.

* * * * *